United States Patent
Ahmed et al.

(10) Patent No.: US 12,435,005 B1
(45) Date of Patent: Oct. 7, 2025

(54) $Fe_2TiO_5/Fe_{1.766}O_3/TiO_2/CoFe_2O_4/C$ NANOCOMPOSITE AND METHOD OF PREPARATION THEREOF

(71) Applicant: IMAM MOHAMMAD IBN SAUD ISLAMIC UNIVERSITY, Riyadh (SA)

(72) Inventors: Ehab Abdelhamed Abdelrahman Ahmed, Riyadh (SA); Babiker Yagoub Elhadi Abdulkhair, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/073,704

(22) Filed: Mar. 7, 2025

(51) Int. Cl.
- *C04B 35/624* (2006.01)
- *C04B 35/26* (2006.01)
- *C04B 35/64* (2006.01)

(52) U.S. Cl.
CPC ........ *C04B 35/2666* (2013.01); *C04B 35/624* (2013.01); *C04B 35/64* (2013.01); *C04B 2235/3234* (2013.01); *C04B 2235/3274* (2013.01); *C04B 2235/422* (2013.01); *C04B 2235/443* (2013.01); *C04B 2235/48* (2013.01); *C04B 2235/6567* (2013.01); *C04B 2235/762* (2013.01); *C04B 2235/765* (2013.01); *C04B 2235/781* (2013.01); *C04B 2235/95* (2013.01)

(58) Field of Classification Search
CPC ........ C04B 35/2666; C04B 2235/3234; C04B 2235/95; C04B 2235/781
See application file for complete search history.

(56) References Cited

U.S. PATENT DOCUMENTS

| | | |
|---|---|---|
| 2014/0178759 A1 | 6/2014 | Worsley et al. |
| 2018/0331369 A1 | 11/2018 | Kumta et al. |
| 2021/0016256 A1 | 1/2021 | Liu et al. |

FOREIGN PATENT DOCUMENTS

PL  246563 B1  9/2024

OTHER PUBLICATIONS

Talaat A. Hameed, et al . . . "Optimization, structural, optical and magnetic properties of TiO2/CoFe2O4 nanocomposites", Ceramics International, vol. 48, Issue 14, Jul. 16, 2022, pp. 20418-20425 (4 pages).

(Continued)

*Primary Examiner* — Alexandre F Ferre
(74) *Attorney, Agent, or Firm* — Oblon, McClelland, Maier &Neustadt, L.L.P.

(57) ABSTRACT

An iron titanium oxide ($Fe_2TiO_5$)/iron oxide ($Fe_{1.766}O_3$)/titanium oxide ($TiO_2$)/cobalt iron oxide ($CoFe_2O_4$)/carbon (C) nanocomposite material includes orthorhombic $Fe_2TiO_5$ phases, rhombohedral $Fe_{1.766}O_3$ phases, tetragonal $TiO_2$ phases and cubic $CoFe_2O_4$ phases where the $Fe_2TiO_5/Fe_{1.766}O_3/TiO_2/CoFe_2O_4/C$ nanocomposite material has a granular morphology including spherical particles having an average particle diameter in a range from 40 to 80 nanometer (nm).

20 Claims, 5 Drawing Sheets

(56) References Cited

OTHER PUBLICATIONS

Anna Zielinska-Jurek, et al., "Design and application of magnetic photocatalysts for water treatment. The effect of particle charge on surface functionality", Catalysts, Nov. 27, 2017, vol. 7 (19 pages).
Dmitri V. Louzguine-Luzgin, et al., "Investigation of Ti—Fe—Co bulk alloys with high strength and enhanced ductility". Acta Materialia, vol. 53, Issue 7. Apr. 2005, pp. 2009-2017 (4 pages).

$Fe_2TiO_5/Fe_{1.766}O_3/TiO_2/CoFe_2O_4/C$ NANOCOMPOSITE AND METHOD OF PREPARATION THEREOF

BACKGROUND

Technical Field

The present disclosure is directed to a nanocomposite, and more particularly, a method of manufacturing a nanocomposite ($Fe_2TiO_5/Fe_{1.766}O_3/TiO_2/CoFe_2O_4/C$) including iron titanium oxide ($Fe_2TiO_5$), iron oxide ($Fe_{1.766}O_3$), titanium oxide ($TiO_2$), cobalt iron oxide ($CoFe_2O_4$), carbon (C).

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

This disclosure addresses a gap in the field of nanocomposite materials by introducing the $Fe_2TiO_5/Fe_{1.766}O_3/TiO_2/CoFe_2O_4/C$ nanocomposite, which has not been previously reported. Existing technologies often suffer from limitations such as inadequate multifunctionality, poor structural stability, limited scalability, and suboptimal performance in applications like environmental remediation, catalysis, and energy storage. Conventional materials are generally restricted to single-phase structures or simple combinations that fail to provide the synergistic properties required for advanced technological applications.

Despite advancements in the field of nanocomposite development, the current methodologies suffer from several drawbacks. The limitations of present methods include poor phase homogeneity, uncontrolled grain growth, and suboptimal material stability, which restrict potential for high-performance applications. In addition, existing synthesis techniques often require complex processing steps, extended reaction times, and high-temperature treatments, leading to increased energy consumption and production costs. Therefore, there is a requirement for an improved synthesis approach that may overcome the aforementioned challenges while delivering nanocomposites with enhanced structural and functional properties Accordingly, it is one object of the present disclosure to provide a synthesis method and system that may circumvent the drawbacks, such as complexity, high cost, lack of multi-phase integration and nanoscale precision, of the materials known in the art.

SUMMARY

In an exemplary embodiment, an iron titanium oxide ($Fe_2TiO_5$)/iron oxide ($Fe_{1.766}O_3$)/titanium oxide ($TiO_2$)/cobalt iron oxide ($CoFe_2O_4$)/carbon (C) nanocomposite material (also referred to as the nanocomposite) is described. The nanocomposite includes orthorhombic $Fe_2TiO_5$ phases, rhombohedral $Fe_{1.766}O_3$ phases, tetragonal $TiO_2$ phases, and cubic $CoFe_2O_4$ phases. The $Fe_2TiO_5/Fe_{1.766}O_3/TiO_2/CoFe_2O_4/C$ nanocomposite material has a granular morphology including spherical particles having an average particle diameter in a range from 40 to 80 nanometers (nm).

In some embodiments, the spherical particles have an average particle diameter in a range from 50 to 65 nm.

In some embodiments, the spherical particles have an average particle diameter in a range from 55 to 60 nm.

In some embodiments, the $Fe_2TiO_5/Fe_{1.766}O_3/TiO_2/CoFe_2O_4/C$ nanocomposite material has an oxygen content in a range from 35 to 60 atomic % (at. %), a cobalt content in a range from 5 to 30 at. %, an iron content in a range from 5 to 20 at. %, a titanium content in a range from 5 to 25 at. %, and a carbon content in a range from 2 to 25 at. %.

In some embodiments, the $Fe_2TiO_5/Fe_{1.766}O_3/TiO_2/CoFe_2O_4/C$ nanocomposite material has an oxygen content in a range from 40 to 55 atomic % (at. %), a cobalt content in a range from 10 to 25 at. %, an iron content in a range from 10 to 20 at. %, a titanium content in a range from 5 to 20 at. %, and a carbon content in a range from 5 to 15 at. %.

In some embodiments, the $Fe_2TiO_5/Fe_{1.766}O_3/TiO_2/CoFe_2O_4/C$ nanocomposite material has an oxygen content in a range from 42 to 52 atomic % (at. %), a cobalt content in a range from 12 to 20 at. %, an iron content in a range from 12 to 20 at. %, a titanium content in a range from 10 to 15 at. %, and a carbon content in a range from 6 to 12 at. %.

In some embodiments, the $Fe_2TiO_5/Fe_{1.766}O_3/TiO_2/CoFe_2O_4/C$ nanocomposite material has an average crystallite size in a range from 40 to 80 nm.

In some embodiments, the $Fe_2TiO_5/Fe_{1.766}O_3/TiO_2/CoFe_2O_4/C$ nanocomposite material has an average crystallite size in a range from 50 to 70 nm.

In some embodiments, the $Fe_2TiO_5/Fe_{1.766}O_3/TiO_2/CoFe_2O_4/C$ nanocomposite material has an average crystallite size in a range from 55 to 68 nm.

In another exemplary embodiment, a method of producing the $Fe_2TiO_5/Fe_{1.766}O_3/TiO_2/CoFe_2O_4/C$ nanocomposite material is described. The method includes adding a first solution including titanium butoxide, ethanol, and acetic acid stepwise to a second solution including cobalt nitrate hexahydrate $Co(NO_3)_2 \cdot 6H_2O$ and iron nitrate nonahydrate $Fe(NO_3)_3 \cdot 9H_2O$ under stirring to form a reaction mixture. The method further includes adding a third solution consisting dextrose monohydrate stepwise to the reaction mixture under stirring at 150 degrees Celsius (° C.). The method further includes stirring the reaction mixture at 150° C. until a solid is formed. The method further includes calcining the solid at a temperature in a range from 600 to 800° C. for 1 to 5 hours (hr) to yield the $Fe_2TiO_5/Fe_{1.766}O_3/TiO_2/CoFe_2O_4/C$ nanocomposite material.

In some embodiments, the concentration of titanium butoxide in the first solution is in a range from 100 to 300 milliliter per liter (ml/L).

In some embodiments, the concentration of titanium butoxide in the first solution is 200 ml/L.

In some embodiments, the concentration of ethanol in the first solution is in a range from 100 to 300 ml/L.

In some embodiments, the concentration of glacial acetic acid in the first solution is in a range from 500 to 700 ml/L.

In some embodiments, the concentration of $Co(NO_3)_2 \cdot 6H_2O$ in the second solution is in a range from 85 to 98 gram per liter (g/L).

In some embodiments, the concentration of $Fe(NO_3)_3 \cdot 9H_2O$ in the second solution is in a range from 120 to 140 g/L.

In some embodiments, the solid is calcined at a temperature in a range from 650 to 750° C.

In some embodiments, the solid is calcined at a temperature of 700° C.

In some embodiments, the solid is calcined for 2 to 4 hr.

In some embodiments, the solid is calcined for 3 hr.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
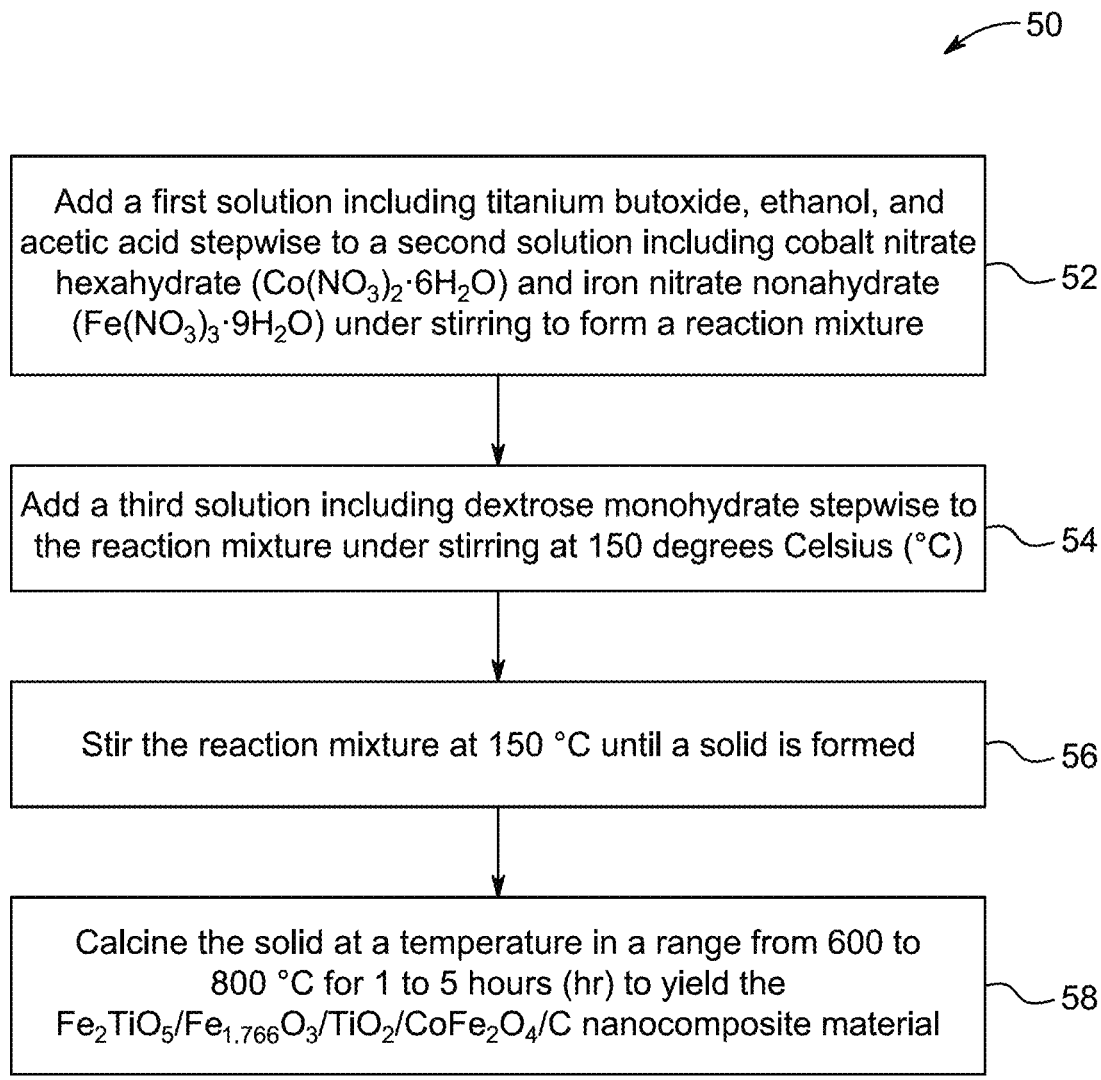
FIG. 1A is a schematic diagram of a flow chart of a method for producing iron titanium oxide ($Fe_2TiO_5$), iron oxide ($Fe_{1.766}O_3$), titanium oxide ($TiO_2$), cobalt iron oxide ($CoFe_2O_4$), carbon (C) nanocomposite ($Fe_2TiO_5/Fe_{1.766}O_3/TiO_2/CoFe_2O_4/C$), according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

When describing the present disclosure, the terms used are to be construed in accordance with the following definitions, unless a context dictates otherwise.

Embodiments of the present disclosure will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

As used herein, the term 'amount' refers to the level or concentration of one or more reactants, catalysts, or materials present in a reaction mixture.

As used herein, the term 'particle' refers to a small object that acts as a whole unit with regard to its transport and properties.

As used herein, the term 'nanocomposite' refers to a composite material in which at least one dimension of the component is in the nanometer size scale (<100 nm). The nanocomposites are thus poly-phase solid materials made up of two or more nanomaterials. The term includes all types of multiphase solid material in which one of the phases has one, two, or three dimensions of less than 100 nm, or structures having nanoscale repeat distances between the different phases that make up the material. The definition within the scope of the disclosure includes porous media, colloids, gels, copolymers, and solid combination of a bulk matrix and nanodimensional phase(s) differing in properties due to dissimilarities in structure and chemistry. The nanocomposites morphologies that are generally prepared include phase separated systems, intercalated systems, and exfoliated systems. The nanocomposites include ceramic matrix nanocomposites (CMNC), polymer matrix nanocomposites (PMNC), metal matrix nanocomposites (MMNC) or any combination thereof.

As used herein, the term 'nanoparticles (NPs)' refers to particles having a particle size of 1 nanometer (nm) to 500 nm within the scope of the present disclosure. The NPs may exist in various morphological shapes, such as nanotubes, nanowires, nanospheres, nanosheets, nanocrystals, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nanowhiskers, nanoflakes, nanofoils, nanopowders, nanoboxes, nanostars, tetrapods, nanobelts, nanourchins, nanoflowers, etc., and mixtures thereof.

As used herein, the term 'room temperature' refers to a temperature range of '23 degrees Celsius (° C.)±2° C. in the present disclosure. As used herein, 'ambient conditions' means the temperature and pressure of the surroundings in which the substance, composition or article is located.

As used herein the term 'disposed' refers to being positioned, placed, deposited, arranged or distributed in a particular manner.

As used herein, the term 'X-ray diffraction' or 'XRD' or 'X-ray crystallography' refers to basic technique for obtaining information on the atomic structure of crystalline materials used as a standard laboratory technique. Unless otherwise specified, the XRD shall include an analytical technique based on the diffraction of X-rays by matter, including for crystalline materials.

As used herein, the term 'Scanning Electron Microscopy' or 'SEM' refers to a surface-imaging technique that produces images of a sample by scanning the sample with a focused beam of electrons. Unless otherwise specified, the SEM shall include all imaging techniques using electron beams for imaging.

In this application, a numerical value interval (i.e., a numerical value range) is involved, and, if not specifically stated, an optional numerical value distribution is considered continuous within the numerical value interval, and includes two numerical value endpoints (i.e., minimum and maximum values) of the numerical value range, and each numerical value between the two numerical value endpoints.

The temperature parameters in the present application, if not specifically limited, are both allowed to be constant temperature processing and also allowed to be varied within a certain temperature interval. It should be understood that the constant temperature processing allows the temperature to fluctuate within the precision range of the instrument control. It is allowed to fluctuate in the range of, for example, 5° C., 4° C., 3° C., 2° C., 1° C.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

In addition, the present disclosure is intended to include all isotopes of atoms occurring in the present compounds and complexes. Isotopes include those atoms having the same atomic number but different mass numbers.

Aspects of this disclosure pertain to a nanocomposite material of $Fe_2TiO_5/Fe_{1.766}O_3/TiO_2/CoFe_2O_4/C$ nanocomposite material fabricated using a sol-gel/combustion method. The nanocomposite material fabricated using a unique combination of sol-gel and combustion methods is simple, cost-effective, and environmentally friendly, enabling the integration of multiple crystalline phases-orthorhombic, rhombohedral, tetragonal, and cubic-into a single material. Further, the nanocomposite material offers enhanced structural and functional properties, making it an advancement in material design with potential applications in environmental, catalytic, and energy-related technologies.

A Fe2TiO5/Fe1.766O3/TiO2/CoFe2O4/C nanocomposite material is described. The $Fe2TiO5/Fe1.766O3/TiO_2/CoFe_2O_4/C$ nanocomposite material includes orthorhombic Fe2TiO5 phases, rhombohedral Fe1.766O3 phases, tetragonal TiO2 phases, and cubic CoFe2O4 phases. In some embodiments, each component of the Fe2TiO5/Fe1.766O3/TiO2/CoFe2O4/C nanocomposite may exist in other crystalline phases as well, such as quartz, calcite, hematite, magnetite, goethite, dolomite, albite, anorthite, pyrite, fluorite, halite, barite, apatite, rutile, and zircon.

In some embodiments, the nanocomposite is porous. Pores may be micropores, mesopores, macropores, and/or a combination thereof. The pores exist in the bulk material, not necessarily in the molecular structure of the material. The term 'microporous' means that nanocomposite have pores with an average pore width (i.e. diameter) of less than 2 nm. The term 'mesoporous' means the pores of the nanocomposite have an average pore width of 2-50 nm. The term 'macroporous' means the pores of nanocomposite have an average pore width larger than 50 nm. Pore size may be determined by methods including, but not limited to, gas adsorption (e.g., N2 adsorption), mercury intrusion porosimetry, and imaging techniques such as scanning electron microscopy (SEM) and X-ray computed tomography (XRCT).

The Fe2TiO5/Fe1.766O3/TiO2/CoFe2O4/C nanocomposite material has a granular morphology, including spherical particles. The spherical particles have an average particle diameter in a range from 50 to 100 nm, preferably 40 to 80 nm, preferably 50 to 70 nm, preferably 50 to 65 nm, preferably 55 to 65 nm, preferably 55 to 60 nm, preferably 58 to 60 nm, preferably about 58+2 nm. In a specific embodiment, the spherical particles have an average particle diameter of about 58.82 nm.

In some embodiments, the Fe2TiO5/Fe1.766O3/TiO2/CoFe2O4/C nanocomposite material has an average crystallite size in a range from 50 to 100 nm, preferably 40 to 80 nm, preferably 50 to 70 nm, preferably 55 to 68 nm, preferably 55 to 65 nm, preferably 56 to 64 nm, preferably 57 to 63 nm, preferably 59 to 63 nm, and preferably 60 to 63 nm. In a specific embodiment, the $Fe_2TiO_5/Fe_{1.766}O_3/TiO_2/CoFe_2O_4/C$ nanocomposite material has an average crystallite size of about 62.17 nm.

In some embodiments, the $Fe_2TiO_5/Fe_{1.766}O_3/TiO_2/CoFe_2O_4/C$ nanocomposite material has an oxygen content in a range from 25 to 70 atomic % (at. %), preferably 35 to 60 at. %, preferably 40 to 55 at. %, preferably 42 to 52 at. %, preferably 45 to 50 at. %, preferably 46 to 49 at. %, preferably 46 to 48 at. %. In one specific embodiment, the $Fe_2TiO_5/Fe_{1.766}O_3/TiO_2/CoFe_2O_4/C$ nanocomposite material has an oxygen content of 46.9 at. %.

In some embodiments, the Fe2TiO5/Fe1.766O3/TiO2/CoFe2O4/C nanocomposite material has a cobalt content in a range from 1 to 40 at. %, preferably 5 to 30 at. %, preferably 6 to 25 at. %, preferably 8 to 20 at. %, preferably 10 to 20 at. %, preferably 12 to 18 at. %, preferably 14 to 18 at. %, preferably 15 to 17 at. %. In one specific embodiment, the Fe2TiO5/Fe1.766O3/TiO2/CoFe2O4/C nanocomposite material has a cobalt content of about 16.9 at. %.

In some embodiments, the Fe2TiO5/Fe1.766O3/TiO2/CoFe2O4/C nanocomposite material has an iron content in a range from 1 to 30 at. %, preferably 5 to 20 at. %, preferably 6 to 18 at. %, preferably 8 to 16 at. %, preferably 10 to 15 at. %, preferably 11 to 14 at. %, preferably 11 to 13 at. %. In one specific embodiment, the Fe2TiO5/Fe1.766O3/TiO2/CoFe2O4/C nanocomposite material has an iron content of about 11.7 at. %.

In some embodiments, the Fe2TiO5/Fe1.766O3/TiO2/CoFe2O4/C nanocomposite material has a titanium content in a range from 1 to 40 at. %, preferably 5 to 25 at. %, preferably 6 to 20 at. %, preferably 8 to 18 at. %, preferably 10 to 15 at. %, preferably 10 to 13 at. %, preferably 10 to 12 at. %, preferably 10 to 11 at. %. In one specific embodiment, the Fe2TiO5/Fe1.766O3/TiO2/CoFe2O4/C nanocomposite material has a titanium content of about 11.7 at. %.

In some embodiments, the Fe2TiO5/Fe1.766O3/TiO2/CoFe2O4/C nanocomposite material has a carbon content in a range from 1 to 40 at. %, preferably 2 to 25 at. %, preferably about 3 to 20 at. %, preferably 5 to 15 at. %, preferably 6 to 12 at. %, preferably 8 to 10 at. %, preferably 8 to 9 at. %. In one specific embodiment, the Fe2TiO5/Fe1.766O3/TiO2/CoFe2O4/C nanocomposite material has a carbon content of about 8.7 at. %.

In a specific embodiment, the Fe2TiO5/Fe1.766O3/TiO2/CoFe2O4/C nanocomposite material has a carbon content of 8.7 at. %, an oxygen content of 46.9 at. %, titanium content of 11.7 at. %, iron content of about 15.8 at. %, and cobalt content of 16.9 at. %.

In one or more embodiments, the Fe2TiO5/Fe1.766O3/TiO2/CoFe2O4/C nanocomposite material has 5 to 30 wt. %, preferably 10 to 20 wt. % Fe2TiO5, 15 to 40 wt. %, preferably 23 to 33 wt. % Fe1.766O3, 15 to 40 wt. %, preferably 23 to 33 wt. % TiO2, 8 to 28 wt. %, preferably 13 to 23 wt. % CoFe2O4, and 1 to 20 wt. %, preferably 3 to 13 wt. % C, based on the total weight of the Fe2TiO5/Fe1.766O3/TiO2/CoFe2O4/C nanocomposite material.

In some embodiments, the phase ratios, crystallite size, and surface morphology can be tuned depending on the synthesis method (e.g., sol-gel, hydrothermal, combustion, or sonochemical methods). FIG. 1A illustrates a schematic flow chart of a method 50 of producing the Fe2TiO5/Fe1.766O3/TiO2/CoFe2O4/C nanocomposite material. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes adding a first solution including titanium butoxide, ethanol, and acetic acid stepwise to a second solution including Co(NO3)2·6H2O and Fe(NO3)3·9H2O under stirring to form a reaction mixture. Titanium butoxide serves as a titanium source, ethanol serves as a solvent for Ti(OBu)$_4$, leading to uniform dispersion, and acetic acid serves as a chelating agent to control hydrolysis and prevent uncontrolled precipitation. In some embodiments, the concentration of titanium butoxide in the first solution is in a range from 50 to 400 ml/L, preferably 100 to 300 ml/L, preferably about 200 mL. In some embodiments, the concentration of ethanol in the first solution is in the range from 50 to 400 ml/L, preferably 100 to 300 ml/L. In some embodiments, the concentration of glacial acetic acid in the first solution is in a range from 400 to 800 ml/L, preferably 500 to 700 ml/L. In some embodiments, the concentration of Co(NO3)2·6H2O in the second solution is in a range from 50 to 150 g/L, preferably 85 to 98 g/L. In some embodiments, the concentration of Fe(NO3)3·9H2O in the second solution is in a range from 50 to 200 g/L, preferably 120 to 140 g/L.

At step 54, the method 50 includes adding a third solution comprising dextrose monohydrate stepwise to the reaction mixture under stirring at 150° C. Dextrose monohydrate ($C_6H_{12}O_6 \cdot H_2O$) acts as a fuel, aiding combustion by reducing metal ions and facilitating the synthesis of the nanocomposite. Certain alternatives to dextrose monohydrate, include, but are not limited to, urea, citric acid, glycine, sucrose, glucose, polyvinyl alcohol, polyethylene glycol, egg white, ascorbic acid, etc. After adding the third solution to the reaction mixture, it is heated to 150° C. to evaporate water. In one or more embodiments, the concentration of dextrose monohydrate in the third solution is in a range from 40 to 120 g/L, preferably 50 to 110 g/L, preferably 60 to 85 g/L.

At step 56, the method 50 includes stirring the reaction mixture at 100 to 200° C., preferably 150° C. until a solid is formed. The reaction mixture is stirred until a gel-like precursor formation is initiated, wherein the gel-like precursor is a solid.

At step 58, the method 50 includes calcining the solid at a temperature in a range from 600 to 800° C. for 1 to 5 h to yield the Fe2TiO5/Fe1.766O3/TiO2/CoFe2O4/C nanocomposite material. The calcination is carried out by heating it to a high temperature under a restricted supply of ambient oxygen. This is performed to remove impurities or volatile substances and to incur thermal decomposition. Typically, the calcination is carried out in a furnace, preferably equipped with a temperature control system, which may provide a heating rate of up to 50 degrees Celsius/minute (° C./min), preferably up to 40° C./min, preferably up to 30° C./min, preferably up to 20° C./min, preferably up to 10° C./min, preferably up to 3 to 5° C./min. In some embodiments, the calcination process occurs with a ramping temperature of 3-5° C./min at a temperature range of 650 to 750° C., preferably 700° C. In some embodiments, the solid is calcined for 2 to 4 hours, preferably 3 hours to yield the Fe2TiO5/Fe1.766O3/TiO2/CoFe2O4/C nanocomposite material.

The following examples are provided solely for illustration and are not to be construed as limitations of the present disclosure, as many variations thereof are possible without departing from the spirit and scope of the present disclosure.

EXAMPLES

The following examples demonstrate a method of fabricating a Fe2TiO5/Fe1.766O3/TiO2/CoFe2O4/C nanocomposite including iron titanium oxide (Fe2TiO5), iron oxide (Fe1.766O3), titanium oxide (TiO2), cobalt iron oxide (CoFe2O4), carbon (C). The examples are provided solely for illustration and are not to be construed as limitations of the present disclosure, as many variations thereof are possible without departing from the spirit and scope of the present disclosure.

Figure 1B:
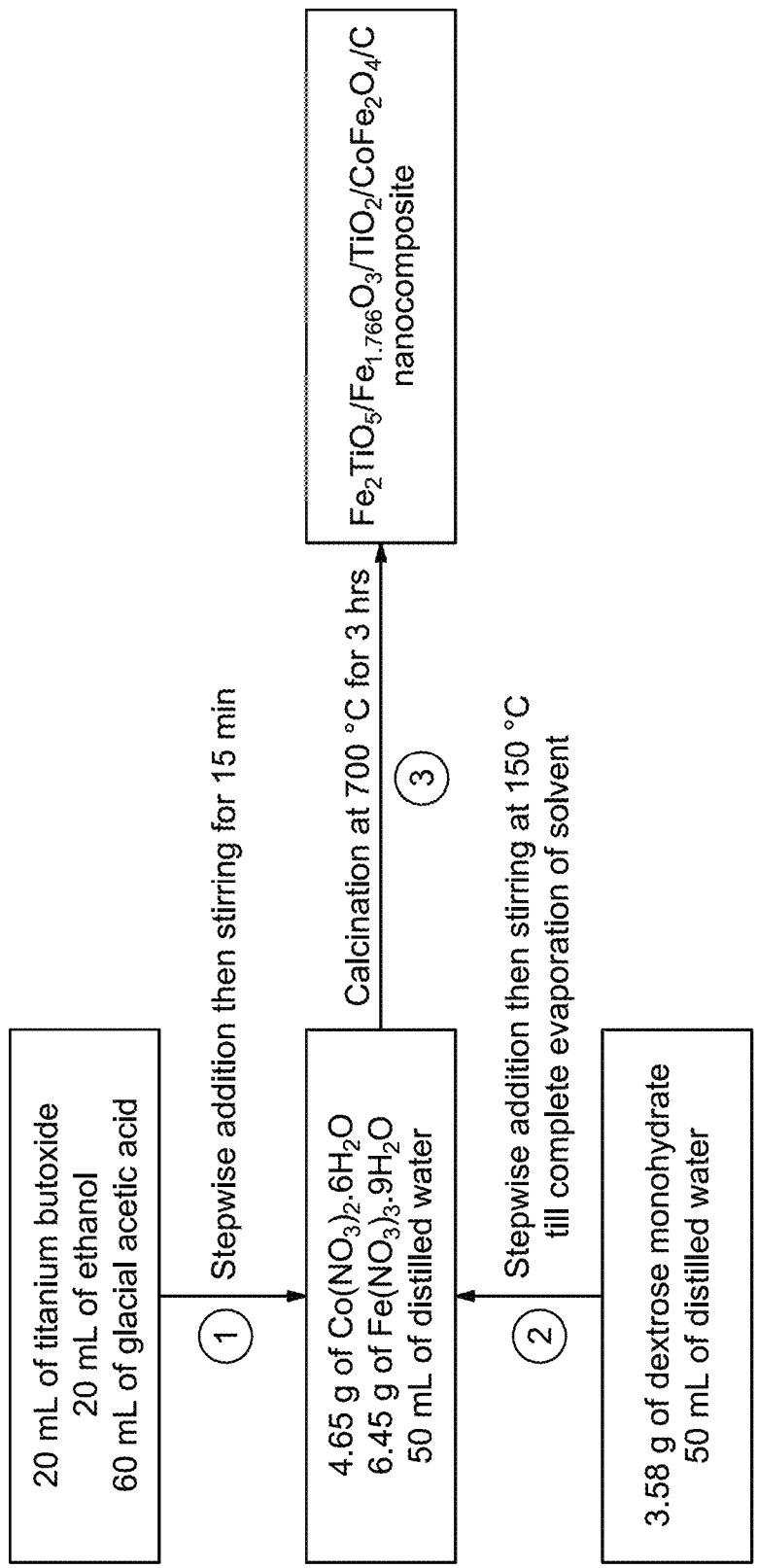
FIG. 1B is an exemplary flow chart of a method of the production of the $Fe_2TiO_5/Fe_{1.766}O_3/TiO_2/CoFe_2O_4/C$ nanocomposite, according to certain embodiments.

Example 1: Synthesis of $Fe_2TiO_5/Fe_{1.766}O_3/TiO_2/CoFe_2O_4/C$ Nanocomposite Using Sol-Gel/Combustion Method According to the present disclosure, the synthesis of the $Fe_2TiO_5/Fe_{1.766}O_3/TiO_2/CoFe_2O_4/C$ nanocomposite was achieved through a combined sol gel and combustion method, as illustrated in FIG. 1B the method represents the synthesis process of the $Fe_2TiO_5/Fe_{1.766}O_3/TiO_2/CoFe_2O_4/C$ nanocomposite using a combined sol-gel and combustion method. The synthesis began with the dissolution of 20 milliliter (mL) of titanium butoxide in a mixture of 20 mL of ethanol and 60 mL of glacial acetic acid. Separately, 4.65 gram (g) of cobalt nitrate hexahydrate ($Co(NO_3)_2 \cdot 6H_2O$) and 6.45 g of iron nitrate nonahydrate ($Fe(NO_3)_3 \cdot 9H_2O$) were dissolved in 50 mL of distilled water. The titanium solution was then added stepwise to the cobalt/iron solution under continuous stirring for 15 minutes (min). Subsequently, 3.58 g of dextrose monohydrate was dissolved in 50 mL of distilled water and added stepwise to the mixture with continuous stirring at 150 degrees Celsius (° C.) until the solvent was completely evaporated. The resulting powder was then subjected to calcination at 700° C. for 3 hours (hrs) to yield $Fe_2TiO_5/Fe_{1.766}O_3/TiO_2/CoFe_2O_4/C$ nanocomposite.

TABLE 1

Structural and crystallographic properties of the nanocomposite components.

| Components of the nanocomposite | | | | Average crystallite size of the nanocomposite |
|---|---|---|---|---|
| Phase | Chemical name | Card No. | Crystal system | (nm) |
| $Fe_2TiO_5$ | Iron titanium oxide | JCPDS-00-041-1432 | Orthorhombic | 62.17 |
| $Fe_{1.766}O_3$ | Iron oxide | JCPDS-01-076-9683 | Rhombohedral | |
| $TiO_2$ | Titanium oxide | JCPDS-01-087-0710 | Tetragonal | |
| $CoFe_2O_4$ | Cobalt iron oxide | JCPDS-00-066-0244 | Cubic | |

Example 2: Characterization of $Fe_2TiO_5/Fe_{1.766}O_3/$
$TiO_2/CoFe_2O_4/C$ Nanocomposite X-ray diffraction (XRD) was employed to identify the crystalline phases present in the nanocomposite. Scanning electron microscopy (SEM) provided detailed insights into the surface morphology and particle size distribution of the nanocomposite. Transmission electron microscopy (TEM) further complemented the morphological analysis by offering high-resolution images of the nanostructure. Energy-dispersive X-ray spectroscopy (EDX) was used to confirm the elemental composition of the nanocomposite, leading to the presence of the intended materials.

Figure 2:
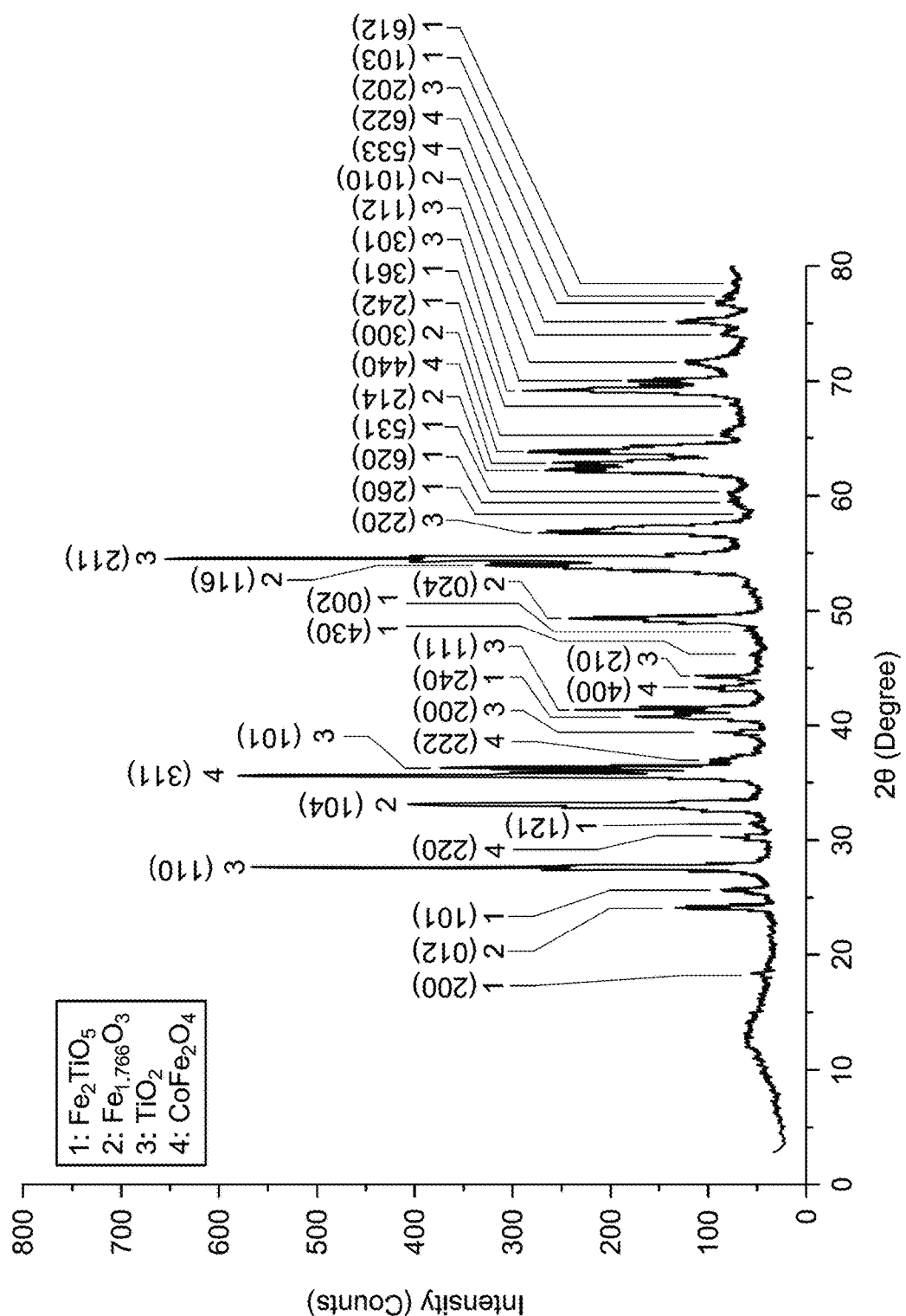
FIG. 2 is a graph depicting an X-ray diffraction (XRD) pattern of the synthesized nanocomposite, according to certain embodiments.

FIG. 2 illustrates the XRD pattern of the synthesized nanocomposite, while Table 1 provides detailed structural and crystallographic properties of its components. The synthesized nanocomposite consists of multiple crystalline phases, including orthorhombic $Fe_2TiO_5$ (iron titanium oxide) identified with card number JCPDS-00-041-1432, rhombohedral $Fe_{1.766}O_3$ (iron oxide) identified with card number JCPDS-01-076-9683, tetragonal $TiO_2$ (titanium oxide) identified with card number JCPDS-01-087-0710, and cubic $CoFe_2O_4$ (cobalt iron oxide) identified with card number JCPDS-00-066-0244. The orthorhombic crystal system of $Fe_2TiO_5$ exhibits diffraction peaks at 2θ angles of 18.35, 25.49, 31.37, 40.71, 46.06, 48.26, 58.24, 59.39, 60.12, 65.26, 67.99, 77.15, and 78.38, corresponding to the Miller indices (200), (101), (121), (240), (430), (002), (260), (620), (531), (242), (361), (103), and (612), respectively. The rhombohedral crystal system of $Fe_{1.766}O_3$ shows diffraction peaks at 2 theta (θ) angles of 24.13, 33.05, 49.21, 53.94, 62.22, 63.80, and 71.55, corresponding to the Miller indices (012), (104), (024), (116), (214), (300), and (1 0 10), respectively. The tetragonal crystal system of $TiO_2$ exhibits diffraction peaks at 2θ angles of 27.59, 36.09, 39.34, 41.33, 44.18, 54.46, 56.87, 69.15, 69.88, and 76.68, corresponding to the Miller indices (110), (101), (200), (111), (210), (211), (220), (301), (112), and (202), respectively. The cubic crystal system of $CoFe_2O_4$ exhibits diffraction peaks at 2θ angles of 30.22, 35.57, 36.83, 43.23, 62.75, 74.07, and 75.02, corresponding to the Miller indices (220), (311), (222), (400), (440), (533), and (622), respectively. The average crystallite size of the synthesized nanocomposite, calculated using the Scherrer equation, is 62.17 nanometer (nm).

Figure 3:
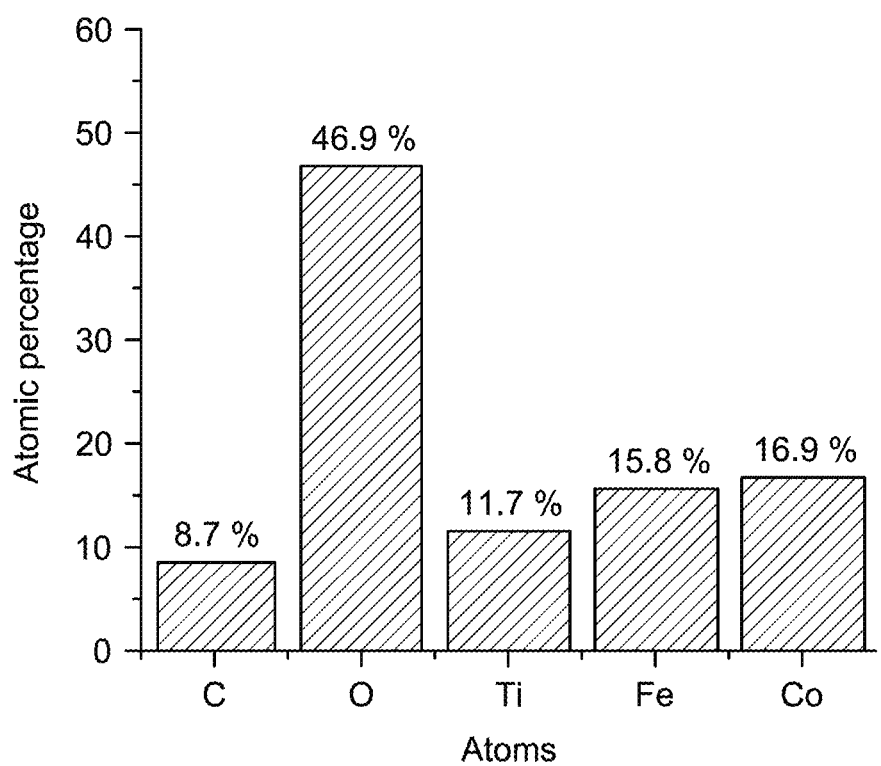
FIG. 3 is a graph depicting distribution of atomic percentages of elements in the synthesized nanocomposite as determined by energy dispersive X-ray spectroscopy (EDX), according to certain embodiments.

Further, FIG. 3 illustrates the atomic percentage distribution of the elements present in the synthesized nanocomposite as determined by EDX. The results reveal that oxygen constitutes the highest atomic percentage at 46.9%, followed by cobalt at 16.9%, iron at 15.8%, titanium at 11.7%, and carbon at 8.7%. These findings confirm the successful incorporation of the elements in the synthesized nanocomposite in accordance with its intended composition and structural framework. The high oxygen content reflects the presence of oxide phases in the nanocomposite, while the other elemental distributions highlight the contributions of titanium, cobalt, and iron to the overall structure.

Figure 4:
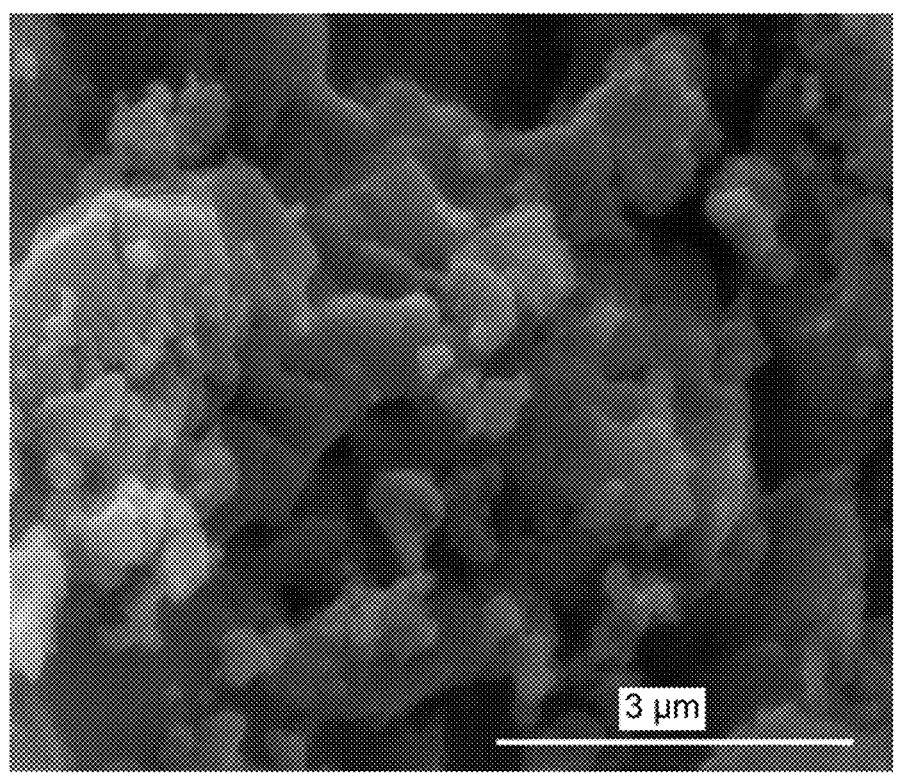
FIG. 4 is a scanning electron microscope (SEM) image of the synthesized nanocomposite, according to certain embodiments.

As mentioned above, the morphology of the prepared nanocomposite was examined by SEM. FIG. 4 presents the SEM image of the synthesized $Fe_2TiO_5/Fe_{1.766}O_3/TiO_2/CoFe_2O_4/C$ nanocomposite, revealing its surface morphology and structural characteristics. The image demonstrates agglomerated clusters consisting of irregularly shaped nanoparticles and porous structures. The observed morphologies include granular and spherical-like particles, which form a highly interconnected network. These features indicate the successful synthesis of the nanocomposite with a uniform distribution of its components and highlight the potential porosity that could enhance its functional properties.

Figure 5:
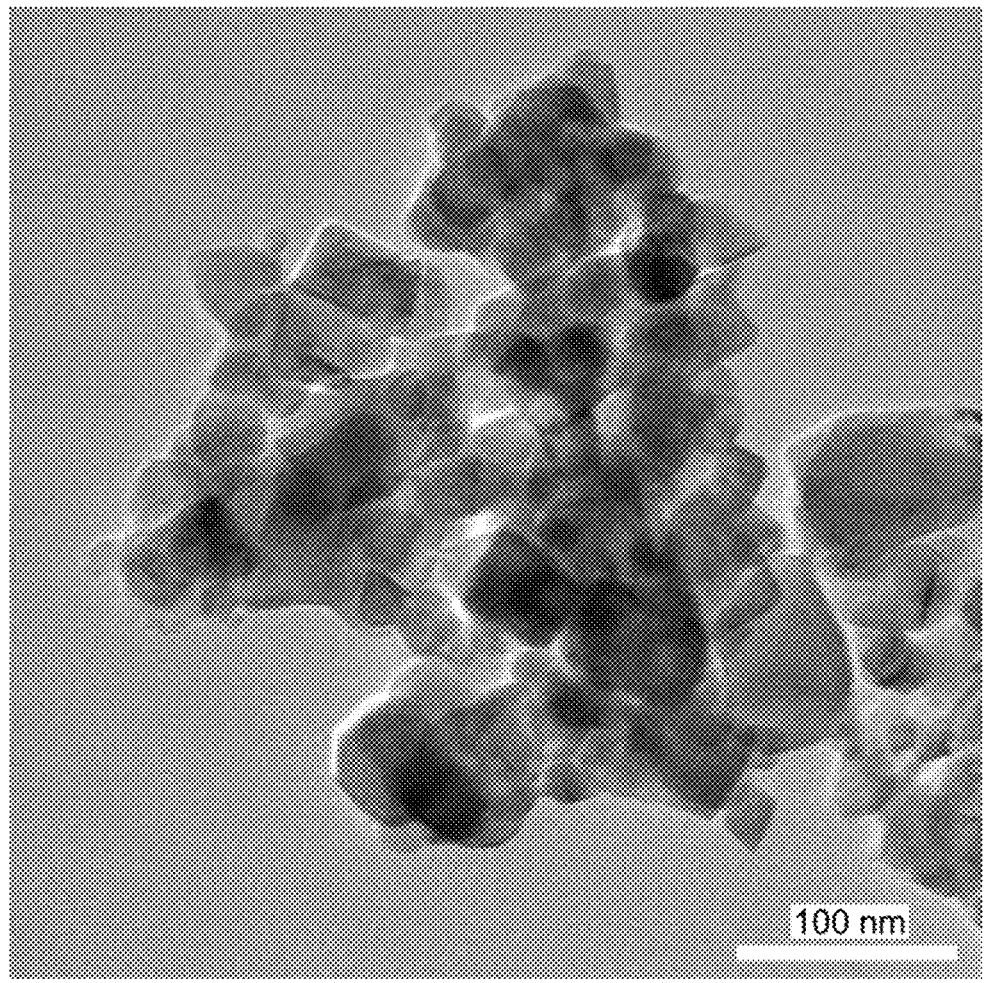
FIG. 5 is high-resolution transmission electron microscope (HRTEM) image of the synthesized nanocomposite, according to certain embodiments.

FIG. 5 presents the HRTEM image of the synthesized $Fe_2TiO_5/Fe_{1.766}O_3/TiO_2/CoFe_2O_4/C$ nanocomposite, showcasing the morphology and particle distribution at the nanoscale. The image reveals a collection of polyhedral and nearly spherical nanoparticles with well-defined edges and clear boundaries, indicating the crystalline nature of the synthesized material. The interconnected arrangement of the nanoparticles contributes to the formation of a compact network structure. The average particle diameter of the synthesized nanocomposite is 58.82 nm, which confirms the nanoscale size of the particles and supports the material's potential for advanced applications.

In the present disclosure, the $Fe_2TiO_5/Fe_{1.766}O_3/TiO_2/CoFe_2O_4/C$ nanocomposite is the multifunctional material synthesized through the combined sol-gel and combustion method, incorporating orthorhombic, rhombohedral, tetragonal, and cubic crystalline phases, with an average crystallite size of 62.17 nm as determined by XRD. It features a porous, interconnected network morphology, with granular and spherical-like nanoparticles, and a particle diameter of 58.82 nm as revealed by HRTEM. The compositional distribution, determined by EDX consisting of 46.9% oxygen, 16.9% cobalt, 15.8% iron, 11.7% titanium, and 8.7% carbon. The synthesis method involves dissolving titanium butoxide in ethanol and glacial acetic acid, combining cobalt nitrate and iron nitrate with water, adding dextrose monohydrate, and calcining at 700° C. for 3 hours, is scalable, environmentally friendly, and cost-effective. The nanocomposite exhibits enhanced functional properties, including improved structural stability, nanoscale dimensions, and porosity, making it suitable for advanced technological applications such as energy storage.

Numerous modifications and variations of the present disclosure are possible in light of the above teachings. It is therefore to be understood that within the scope of the appended claims, the disclosure may be practiced otherwise than as specifically described herein.

The invention claimed is:

1. An iron titanium oxide ($Fe_2TiO_5$)/iron oxide ($Fe_{1.766}O_3$)/titanium oxide ($TiO_2$)/cobalt iron oxide ($CoFe_2O_4$)/carbon (C) nanocomposite material, comprising:
   an orthorhombic $Fe_2TiO_5$ phase;
   a rhombohedral $Fe_{1.766}O_3$ phase;
   a tetragonal $TiO_2$ phase; and
   a cubic $CoFe_2O_4$ phase,
   wherein the $Fe_2TiO_5/Fe_{1.766}O_3/TiO_2/CoFe_2O_4/C$ nanocomposite material has a granular morphology comprising spherical particles having an average particle diameter in a range from 40 to 80 nanometer (nm).

2. The $Fe_2TiO_5/Fe_{1.766}O_3/TiO_2/CoFe_2O_4/C$ nanocomposite material of claim 1, wherein the spherical particles have an average particle diameter in a range from 50 to 65 nm.

3. The $Fe_2TiO_5/Fe_{1.766}O_3/TiO_2/CoFe_2O_4/C$ nanocomposite material of claim 2, wherein the spherical particles have an average particle diameter in a range from 55 to 60 nm.

4. The $Fe_2TiO_5/Fe_{1.766}O_3/TiO_2/CoFe_2O_4/C$ nanocomposite material of claim 1, wherein the $Fe_2TiO_5/Fe_{1.766}O_3/TiO_2/CoFe_2O_4/C$ has an oxygen content in a range from 35 to 60 atomic % (at. %), a cobalt content in a range from 5 to 30 at. %, an iron content in a range from 5 to 20 at. %, a titanium content in a range from 5 to 25 at. %, and a carbon content in a range from 2 to 25 at. %.

5. The $Fe_2TiO_5/Fe_{1.766}O_3/TiO_2/CoFe_2O_4/C$ nanocomposite material of claim 4, wherein the $Fe_2TiO_5/Fe_{1.766}O_3/TiO_2/$ CoFe$_2$O$_4$/C has an oxygen content in a range from 40 to 55 atomic % (at. %), a cobalt content in a range from 10 to 25 at. %, an iron content in a range from 10 to 20 at. %, a titanium content in a range from 5 to 20 at. %, and a carbon content in a range from 5 to 15 at. %.

6. The Fe$_2$TiO$_5$/Fe$_{1.766}$O$_3$/TiO$_2$/CoFe$_2$O$_4$/C nanocomposite material of claim 5, wherein the Fe$_2$TiO$_5$/Fe$_{1.766}$O$_3$/TiO$_2$/CoFe$_2$O$_4$/C has an oxygen content in a range from 42 to 52 atomic % (at. %), a cobalt content in a range from 12 to 20 at. %, an iron content in a range from 12 to 20 at. %, a titanium content in a range from 10 to 15 at. %, and a carbon content in a range from 6 to 12 at. %.

7. The Fe$_2$TiO$_5$/Fe$_{1.766}$O$_3$/TiO$_2$/CoFe$_2$O$_4$/C nanocomposite material of claim 1, wherein the Fe$_2$TiO$_5$/Fe$_{1.766}$O$_3$/TiO$_2$/CoFe$_2$O$_4$/C has an average crystallite size in a range from 40 to 80 nm.

8. The Fe$_2$TiO$_5$/Fe$_{1.766}$O$_3$/TiO$_2$/CoFe$_2$O$_4$/C nanocomposite material of claim 7, wherein the Fe$_2$TiO$_5$/Fe$_{1.766}$O$_3$/TiO$_2$/CoFe$_2$O$_4$/C has an average crystallite size in a range from 50 to 70 nm.

9. The Fe$_2$TiO$_5$/Fe$_{1.766}$O$_3$/TiO$_2$/CoFe$_2$O$_4$/C nanocomposite material of claim 8, wherein the Fe$_2$TiO$_5$/Fe$_{1.766}$O$_3$/TiO$_2$/CoFe$_2$O$_4$/C has an average crystallite size in a range from 55 to 68 nm.

10. A method of producing the Fe$_2$TiO$_5$/Fe$_{1.766}$O$_3$/TiO$_2$/CoFe$_2$O$_4$/C nanocomposite material of claim 1, comprising:
  adding a first solution comprising titanium butoxide, ethanol, and acetic acid stepwise to a second solution comprising cobalt nitrate hexahydrate (Co(NO$_3$)$_2$·6H$_2$O) and iron nitrate nonahydrate (Fe(NO$_3$)$_3$·9H$_2$O) under stirring to form a reaction mixture;
  adding a third solution comprising dextrose monohydrate stepwise to the reaction mixture under stirring at 150 degrees Celsius (° C.);
  stirring the reaction mixture at 150° C. until a solid is formed; and
  calcining the solid at a temperature in a range from 600 to 800° C. for 1 to 5 hours (hr) to yield the Fe$_2$TiO$_5$/Fe$_{1.766}$O$_3$/TiO$_2$/CoFe$_2$O$_4$/C nanocomposite material.

11. The method of claim 10, wherein the concentration of titanium butoxide in the first solution is in a range from 100 to 300 milliliter per liter (ml/L).

12. The method of claim 11, wherein the concentration of titanium butoxide in the first solution is 200 ml/L.

13. The method of claim 10, wherein the concentration of ethanol in the first solution is in a range from 100 to 300 ml/L.

14. The method of claim 10, wherein the concentration of the acetic acid in the first solution is in a range from 500 to 700 ml/L.

15. The method of claim 10, wherein the concentration of Co(NO$_3$)$_2$·6H$_2$O in the second solution is in a range from 85 to 98 gram per liter (g/L).

16. The method of claim 10, wherein the concentration of Fe(NO$_3$)$_3$·9H$_2$O in the second solution is in a range from 120 to 140 g/L.

17. The method of claim 10, wherein the solid is calcined at a temperature in a range from 650 to 750° C.

18. The method of claim 17, wherein the solid is calcined at a temperature of 700° C.

19. The method of claim 10, wherein the solid is calcined for 2 to 4 hr.

20. The method of claim 19, wherein the solid is calcined for 3 hr.

* * * * *